(12) United States Patent
Page

(10) Patent No.: US 12,124,601 B2
(45) Date of Patent: Oct. 22, 2024

(54) SYSTEMS AND METHODS FOR ORCHESTRATING APPLICATION USE WHILE PREVENTING UNAUTHORIZED DATA SHARING

(71) Applicant: Capital One Services, LLC, McLean, VA (US)

(72) Inventor: John Henry Page, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 253 days.

(21) Appl. No.: 17/819,689

(22) Filed: Aug. 15, 2022

(65) Prior Publication Data
US 2024/0054243 A1 Feb. 15, 2024

(51) Int. Cl.
*G06F 21/62* (2013.01)
*H04L 9/08* (2006.01)

(52) U.S. Cl.
CPC ........ *G06F 21/6227* (2013.01); *H04L 9/0825* (2013.01); *H04L 9/0891* (2013.01); *G06F 2221/2141* (2013.01)

(58) Field of Classification Search
CPC ......... G06F 21/6227; G06F 2221/2141; H04L 9/0825; H04L 9/0891
USPC ......................................................... 726/27
See application file for complete search history.

(56) References Cited

U.S. PATENT DOCUMENTS

| 9,300,640 | B2 | 3/2016 | Pate | |
|---|---|---|---|---|
| 10,614,212 | B1 | 4/2020 | Marquardt et al. | |
| 11,106,804 | B2 | 8/2021 | Zhao et al. | |
| 2013/0139271 | A1* | 5/2013 | Arrelid | G06Q 20/1235 726/27 |
| 2020/0336311 | A1* | 10/2020 | Ducker | H04L 9/088 |
| 2021/0271777 | A1 | 9/2021 | Netsch et al. | |
| 2023/0177210 | A1* | 6/2023 | Avanes | G06F 9/541 |

FOREIGN PATENT DOCUMENTS

CN 111090865 A 5/2020

* cited by examiner

*Primary Examiner* — Thanh T Le
(74) *Attorney, Agent, or Firm* — Bookoff McAndrews, PLLC

(57) ABSTRACT

Disclosed are methods and systems for orchestrating application use while preventing unauthorized data sharing. For instance, an orchestration management system may provide orchestration logic to a computing platform system hosting a virtual environment configured to run an application on behalf of a data owner computing device. Once the orchestration logic is loaded thereon, a public key to and a location of the virtual environment may be provided to an application owner's computing device. The orchestration logic may enable the application owner's computing device to access the virtual environment at the location to load the application into the virtual environment utilizing a first key combination including the public key and a matching private key. At least the private key may then be disabled by the orchestration logic to prevent subsequent access to the virtual environment by the application owner to guarantee no unauthorized data sharing.

20 Claims, 5 Drawing Sheets

SYSTEMS AND METHODS FOR ORCHESTRATING APPLICATION USE WHILE PREVENTING UNAUTHORIZED DATA SHARING

TECHNICAL FIELD

Various embodiments of this disclosure relate generally to techniques for orchestrating application use while preventing unauthorized data sharing, and, more particularly, to systems and methods for enabling an application to run in a secure run-time environment independent from an owner of the application and/or an owner of the data being processed by the application using orchestration logic.

BACKGROUND

An application may be a resource of an application owner from which further value may be obtained by making the application available to other parties for use. The parties may include consumers of the application and/or other application owners who may benefit from adding one or more functions of the application to their applications (e.g., where the multiple applications may function as a single unit). However, the application may include intellectual property of the application owner that the application owner does not want to give up control or ownership of, such as proprietary algorithms implemented to perform the various functions. Similarly, a consumer of the application may desire to use the application of the application owner, and thus may enter into a commercial agreement with the application owner associated with the consumer's use of the application. However, the consumer and/or industry-associated regulations may require a guarantee that no individual or entity, including the application owner, has access to any consumer data provided to the application as inputs and/or received from the application as outputs.

Currently, to address the above-mentioned concerns relating to data sharing, trust agreements and/or data encryption may be used. However, trust agreements are merely contractual terms (e.g., are merely a promise to not access the consumer data) and do not otherwise prevent the application owner from accessing the consumer data if desired. For example, if the application owner wanted to secretly capture data of the data owner (e.g., against the contractual terms), the application owner may include source code in the application unbeknownst to the data owner to write the data of the data owner to a log file that can be viewed by the application owner. Additionally, encrypted consumer data ultimately has to be decrypted in order to be consumed and processed by the application to generate the outputs. That is, decryption and thus revealing of the data is necessary for use of the application, as the application is otherwise not operable.

This disclosure is directed to addressing the above-referenced challenges, among other challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for orchestrating application use while preventing data sharing. By generating and implementing orchestration logic, the methods and systems may enable an application that consumes data inputs of a data owner to generate data outputs as part of one or more functions of the application to be run in a secure run-time environment without the data owner or the application owner having direct access to or control of the application or the application data inputs and outputs. Resultantly, implementation of the methods and systems allow use of the application while providing a guarantee that at no time does the application owner possess the data owner's data and at no time does the data owner have access to the underlying data of the application, unless otherwise authorized.

For instance, a computer-implemented method may include providing orchestration logic to a computing platform system hosting a virtual environment configured to run an application on behalf of a first computing device associated with a data owner, receiving an indication that the orchestration logic is loaded on the computing platform system, and providing a first public key to the virtual environment and a location of the virtual environment to a second computing device associated with an owner of the application. The orchestration logic may enable the second computing device to access the virtual environment at the location to load the application utilizing a first key combination comprising the first public key and a first private key that matches the first public key, and at least the first private key may be disabled by the orchestration logic upon the application loading into the virtual environment to prevent subsequent access to the virtual environment by the owner of the application.

A system may include at least one memory storing instructions, and at least one processor operatively connected to the at least one memory and configured to execute the instructions to perform operations. The operations may include providing orchestration logic to a computing platform system hosting a virtual environment configured to run an application on behalf of a first computing device associated with a data owner, receiving an indication that the orchestration logic is loaded on the computing platform system, and providing a first public key to the virtual environment and a location of the virtual environment to a second computing device associated with an owner of the application. The orchestration logic may enable the second computing device to access the virtual environment at the location to load the application utilizing a first key combination comprising the first public key and a first private key that matches the first public key, and at least the first private key may be disabled by the orchestration logic upon the application loading into the virtual environment to prevent subsequent access to the virtual environment by the owner of the application.

A computer-implemented method may include receiving, by an orchestration management system, one or more parameters from at least one of a first computing device of a data owner or a second computing device of an application owner, the one or more parameters associated with the data owner's use of an application of the application owner, and at least one of the parameters identifying a computing platform system of the data owner hosting a virtual environment configured to run the application, generating orchestration logic based on one or more parameters; providing the orchestration logic to the computing platform system, receiving an indication that the orchestration logic is loaded on the computing platform system, and providing a first public key to the virtual environment and a location of the virtual environment to the second computing device. The orchestration logic may enable the second computing device to access the virtual environment at the location to load the application utilizing a first key combination comprising the first public key and a first private key that matches the first public key, and at least the first private key may be disabled by the orchestration logic upon the application loading into the virtual environment to prevent subsequent access to the virtual environment by the owner of the application.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
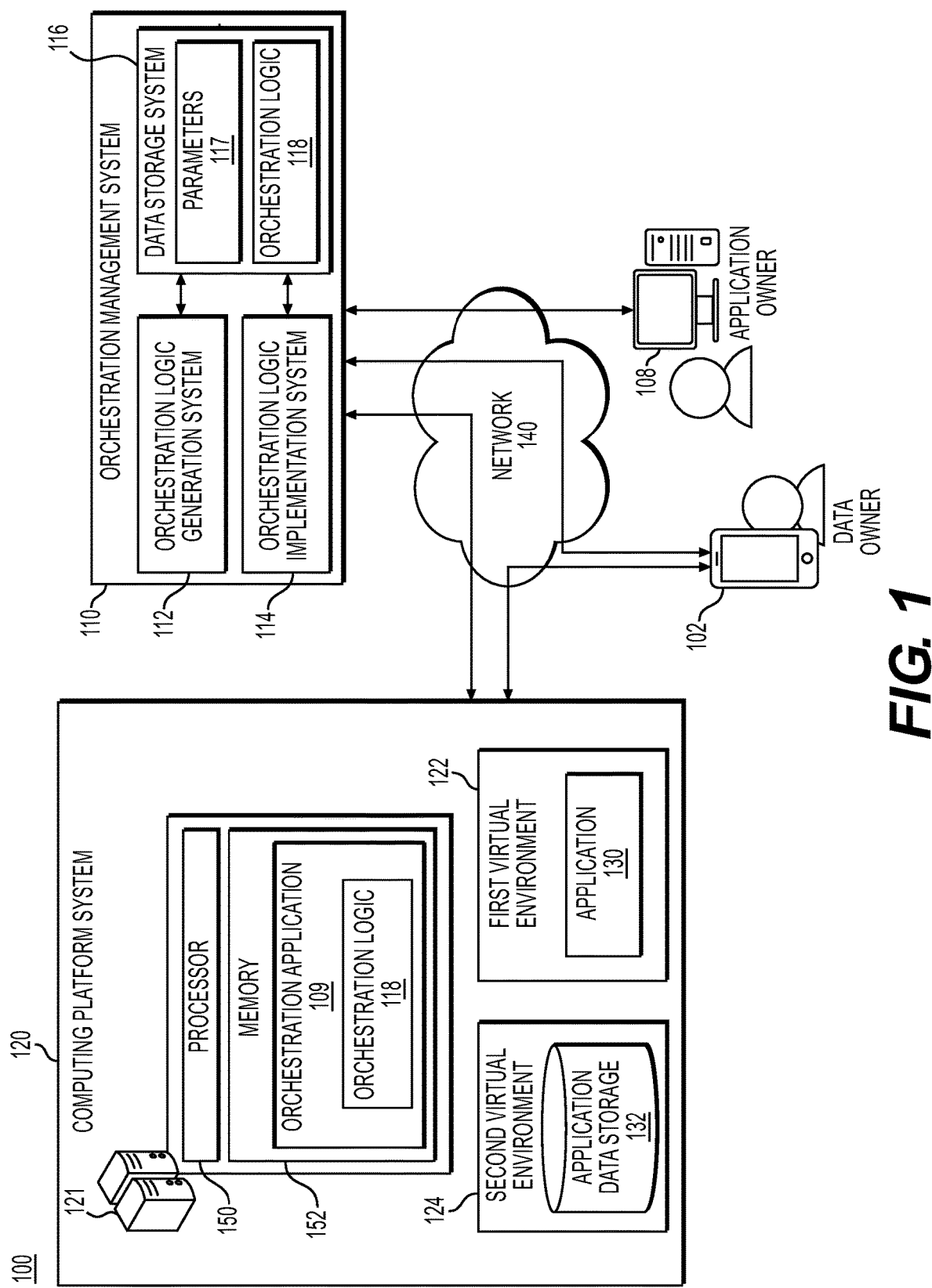
FIG. 1 depicts an exemplary environment for orchestrating application use while preventing unauthorized data sharing, according to certain embodiments.

According to certain aspects of the disclosure, methods and systems are disclosed for orchestrating application use while preventing unauthorized data sharing.

As will be discussed in more detail below, in various embodiments, systems and methods are described for generating and implementing orchestration logic that allows a data owner to utilize an application of an application owner that is running in a secure run-time environment to process data owner data with a guarantee that at no time does the application owner possess the data owner's data and at no time does the data owner have access to the underlying data of the application.

Reference to any particular activity is provided in this disclosure only for convenience and is not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Similarly, the term "or" is intended to mean "and/or," unless explicitly stated otherwise. Relative terms, such as, "substantially" and "generally," are used to indicate a possible variation of ±10% of a stated or understood value.

Terms or phrases like "owner of an application" or "application owner" may generally encompass any person or entity that may own, develop, deploy, monitor and/or update an application, where the application may be provided as a service to other persons or entities, such as a data owner. The term "application" may be used interchangeably with other terms like "program," or the like, and generally encompasses software that is configured to interact with, modify, override, supplement, or operate in conjunction with other software. The term "data owner" may generally encompass any person or entity that utilizes the application of the application owner to process data owned by them using one or more functions of the application. For example, the one or more functions of the application may consume data inputs of the data owner to generate and provide, as output, data outputs.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As one example used herein, the term "orchestration service provider" may generally encompass an entity or person involved in providing, selling, and/or renting orchestration services to persons, such as an application owner of an application and a data owner using the application to process data of the data owner. The orchestration services may include the generation and implementation of orchestration logic to enable use of the application while preventing unauthorized data sharing by any party, including the application owner. The term "orchestration logic" may be comprised of at least the information necessary for the application to be run independently from the data owner and/or the application owner, including how to access data necessary to run the application, such that the application is usable while the data owner's data is inaccessible to the application owner and the application data is inaccessible to the data owner. The orchestration logic may also be able to operate (e.g., enable and disable) one or more public/private key combinations to restrict access to one or more virtual environments in which the application is run and/or the data inputs and outputs of the application are stored to prevent unauthorized data sharing.

As another example used herein, the term "computing platform service provider" may generally encompass an entity or person involved in providing, selling, and/or renting computing platform services to persons for hosting a secure run-time environment in which one or more applications may be run independently of respective application owners of the applications and/or data owners using the applications to process data owner data. The secure run-time environment may also be referred to herein as a virtual environment. In some examples, data of the application(s) (e.g., data inputs and/or data outputs) may be stored within a sub-environment of the secure run-time environment in which the application(s) are run. In other examples, as part of the computing platform services, an additional environment separate from the environment in which the one or more applications are running may be hosted for storing data of the application. Alternatively, rather than directly storing the data of the application itself, the sub-environment or additional environment may run a sharing process that allows data of the application that is stored remotely to be accessed by the application at run-time (e.g., as permitted by orchestration logic described in more detail below). The terms "secure run-time environment" or "virtual environment" may generally encompass an environment that cannot be accessed, altered, or terminated by an individual or entity unless that individual or entity has specific credentials and/or is otherwise verified by a provider of the environment.

In an exemplary use case, certain embodiments may be performed for orchestrating application use while preventing unauthorized data sharing such that the application may be run to process data of a data owner while guaranteeing that the application owner does not have access to the data of the data owner and the data owner does not have access to the underlying data of the application. Resultantly, privacy of the data owner's data may be maintained, and the application owner can be assured that they maintain control of and ownership of intellectual property included within the application.

This guarantee may be provided through orchestration logic that is generated and implemented by an orchestration management system providing orchestration services, where the orchestration logic utilizes public/private key combinations to restrict access to the secure run time-environments in which the application is run and the application data is stored in order to restrict access to and/or control of the application and the application data. The orchestration logic may be generated based on parameters that are associated with commercial terms agreed upon by the application owner and data owner regarding the data owner's use of the application and any other information necessary for the application to be run independently from the data owner and/or the application owner. Such example information may include configurations for the application, data inputs and sources thereof, data outputs and destinations of thereof, operations to be performed on particular data inputs and/or data outputs as part of the application processing, decryption keys to enable decryption of any encrypted data inputs prior to the application processing, encryption keys to encrypt data outputs of the application processing prior to transmission to the destination, etc. The orchestration services may be deployed in cloud-based and/or mobile environments, and may orchestrate use of multiple applications functioning as a single unit that are each running in the same secure run-time environment.

The methods and systems described herein may be advantageously implemented by varying types of application services. As one example, the methods and systems described herein may be implemented in services where application double blindness guarantees are desired (e.g., by the data owner) and/or are mandatory based on industry-associated regulations. To provide an illustrative example, in the financial industry, financial service providers may be forbidden by law to possess or have access to customer data of other affiliates. Therefore, using the orchestration services described herein, one affiliate may be enabled to use an application run by another affiliate with proof that the law is not being broken, as no customer data (or any other unauthorized data) is being shared between the affiliates. To provide another illustrative example, for voting systems, the orchestration services provided may prevent unauthorized application changes, as well as prevent exfiltration and/or updating of voter registration data and votes or tallies.

As another example, the methods and systems described herein may be implemented in services where data for the application processing is consumed from a plurality of sources, and at least one of the plurality of sources is associated with a different owner than the other sources. For example, an application owner may own the application and a machine learning model implemented by the application to perform one or more functions of the application. However, the input data to the machine learning model and the output data from the machine learning model are owned by a different individual or entity that is using the application (e.g., a customer of the application owner). Use of the orchestration services ensures that neither of the different owners can access the data of the other (e.g., application owner cannot access input and/or output data of customer and customer cannot access application and/or model data of application owner). As a further example, the methods and systems described herein may be implemented by application owners and/or any platform or container vendor to provide enhanced containerization services to their customers by guaranteeing they are not able to access their customers' (or their customers' customers') data. Further, the systems and methods described herein may be implemented by application services that deploy a single application that is shared by a plurality of customers each having their own data (e.g., via a shared hosting model), to ensure the application owner nor any of the customers have access to any other of the customers' data.

Additionally, the orchestration services described herein may provide additional enterprise system functionality. As one example, an enterprise system may record data lineage, where applications associated with the enterprise may be registered together with information on the sources of data inputs and their transformations into data outputs within the enterprise system. The orchestration services described herein may provide additional enterprise functionality by storing parameters used to generate the orchestration logic (e.g., storing a manifest defining the parameters) within the enterprise system, where the parameters and/or manifest include the information on the sources of data inputs and their transformations into data outputs. This additional enterprise functionality may enable guaranteed prevention of the applications from consuming unregistered data and from unregistered applications using others' data without the presence of a private key of the application owner, as described in more detail below. Further, access to the application or any data inputs may be revoked using a parameter and/or manifest update rather than taking down the application or removing data. To provide an illustrative example, the government may have one or more contractors that have access to federal data. The orchestration services may provide a systematic means to guarantee a termination of a contractor application's access to input and/or output federal data of the government, thereby preventing unauthorized retention and usage.

It should also be understood that the examples above are illustrative only. The techniques and technologies of this disclosure may be adapted to any suitable activity.

FIG. 1 depicts an exemplary environment 100 for orchestrating application use while preventing data sharing, according to certain embodiments, and which may be used with the techniques presented herein. A data owner computing device 102 and/or an application owner computing device 108 may communicate with one or more of the other components of the environment 100 across electronic network 140, including an orchestration management system 110 and/or a computing platform system 120. The data owner computing device 102 may be associated with a data owner utilizing an application 130 to perform various functions, where at least one of the functions consumes and processes data of the data owner (e.g., as input) to yield an output that may be specific to the data owner and/or include portions of the data owner's data.

The application 130 may be a single application. In other examples, the application 130 may be used in conjunction with one or more other applications that function as a single unit described in more detail elsewhere herein. The application owner computing device 108 may be associated with an owner of the application 130 (e.g., referred to herein as application owner) that owns, develops, deploys, monitors, and/or updates the application 130 for use by consumers, such as the data owner associated with the data owner computing device 102. Although only one application owner computing device 108 is shown in FIG. 1, in examples, where multiple applications may function as the single unit, one or more of the applications may be associated with a different application owner than the other applications. In such examples, the environment 100 may include up to N application owner computing devices that communicate with the orchestration management system 110 over the network 140, where N may be equal to the number of different owners of the applications comprising the single unit. Alternatively, each of the applications comprising the single unit may be owned by the same application owner (e.g., the application owner associated with application owner computing device 108). The application(s) may be web applications deployed in a cloud environment and/or local applications deployed in a mobile environment.

The orchestration management system 110 may include one or more server devices (or other similar computing devices) for executing orchestration services. The orchestration management system 110 may be associated with an orchestration service provider providing the orchestration services to data owners and application owners, such as the data owner associated with the data owner computing device 102 and the application owner associated with the application owner computing device 108. The orchestration services enable the data owner to process its data using the application 130 of the application owner with a guarantee that at no time does the application owner possess the data owner's data and at no time does the data owner have access to the data of the application 130. For example, and as described in more detail elsewhere herein, a orchestration logic generation system 112 (e.g., a sub-system or component of the orchestration management system 110) may receive parameters 117 based on an agreement between the data owner and the application owner associated with the data owner's use of the application 130, and including information necessary to run the application 130 independently of the application owner and data owner. In some examples, the parameters 117 may be defined within a manifest. The orchestration logic generation system 112 may then generate orchestration logic 118 based on the parameters 117. In examples, where multiple applications may function as a single unit, the parameters 117 and thus orchestration logic 118 may be based on agreements between the data owner and the application owner(s) associated with the data owner's use of each of the applications.

The parameters 117 (or the manifest) and the orchestration logic 118 may be stored in one or more data storage system(s) 116 of the orchestration management system 110, as depicted in FIG. 1, and may be modifiable based on updates to the agreement. Public key encryption, among other cryptographic techniques, may be used to ensure confidentiality of the parameters 117 received and any modifications to the parameters 117 from any party (e.g., from the application owner and/or data owner). For example, messages between the orchestration management system 110 and the respective data owner computing device 102 and/or application owner computing device 108 may be encrypted with the intended recipient's public key, which cannot be decrypted without the matching private key. Additionally or alternatively, verification digital signatures, in which messages are signed with the sender's private key and can be verified by anyone who has access to the sender's public key, may provide verification that the sender is a legitimate sender associated with the party having access to the private key. Additionally, the verification digital signatures may ensure that the messages have not been tampered with as a signature is mathematically bound to the message it originally was made from, and verification will fail for any other message, no matter how similar to the original message.

Further, in some examples, the application owner may be associated with a first key combination comprising a first public key and matching first private key of the application owner, and the data owner may be associated with a second key combination comprising a second public key and matching second private key of the data owner. The first and second key combinations may be operated (e.g., enabled or disabled) in accordance with the orchestration logic 118 to unlock or lock one or more virtual environments of the computing platform system 120 (e.g., to provide access to or restrict access from the application owner and data owner through their respective matching private key), as described below. In some examples, an authority orchestrates and maintains a register of the public key ownerships with the consent of the application owner and data owner. The authority may be associated with one of the components of the environment 100, such as the orchestration management system 110 or the computing platform system 120. Alternatively, the authority may be a separate component of the environment 100. The above-described encryption and verification is one example approach that may be implemented. However, different approaches to encryption and verification may be used.

An orchestration logic implementation system 114 (e.g., a sub-system or component of the orchestration management system 110) may provide a copy of at least a portion of the orchestration logic 118 to the computing platform system 120 and restrict access to and/or control of the application 130 and the application data storage 132 by the application owner and/or the data owner via the orchestration logic 118 through operation of the first and/or second key combinations in accordance with the orchestration logic 118, as described in more detail below.

The data storage system 116 may include a computer-readable memory such as a hard drive, flash drive, disk, etc. In some embodiments, the data storage system 116 may include and/or interact with an application programming interface for exchanging data to other systems, e.g., one or more of the other components of the environment, such as at least the orchestration logic generation system 112 and orchestration logic implementation system 114. In some examples, the data storage system 116 may be a sub-system or component of the orchestration management system 110 (e.g., when the data storage system 116 is also provided by the provider rather than a third party). In other examples, the data storage system 116 may be external from the orchestration management system 110 (e.g., may be hosted by a third party providing data storage services to the orchestration management system 110). The data storage system 116 may include and/or act as a repository or source for various types of orchestration related data, including agreements, parameters 117, manifests, and/or orchestration logic 118.

The orchestration logic 118 comprises information for orchestrating application use while preventing unauthorized data sharing. For example, once the orchestration logic 118 is installed on the computing platform system 120, the application owner, via the application owner computing device 108 may be provided the first public key of the first key combination and load the application 130 into a first secure run-time environment (e.g., a first virtual environment 122), described in more detail below, using the first key combination that is enabled by the orchestration logic 118. For example, the enabled first private key of the application owner matching the first public key may allow the application owner access to (e.g., the enabled first private key may unlock) the first virtual environment 122 to load the application 130. Because the first private key is private to the application owner (e.g., the data owner does not have the first private key), the data owner is prevented from accessing (e.g., from unlocking) the first virtual environment 122, and thus cannot access the application 130 or underlying data (e.g., machine learning algorithms, etc.) loaded therein. Once the application 130 is loaded, the first private key may be disabled by the orchestration logic 118 to prevent the application owner from accessing the first virtual environment 122 in which the application 130 is run (e.g., the first private key may no longer unlock the secure run-time environment). Instead, the application owner can only access and/or control the application 130 via the orchestration logic 118, and thus the application owner cannot access data of the data owner that is provided as input to the application 130 and/or data output of the application 130 as the application 130 is being run in the first virtual environment 122.

In some examples, the orchestration logic 118 may also operate (e.g., enable or disable) the second key combination (e.g., when computing platform system 120 owned by a party other than the data owner). For example, the second public key may be provided to the data owner computing device 102, and the enabled second private key of the data owner may allow the data owner access to (e.g., the enabled second private key may unlock) a second secure run-time environment (e.g., a second virtual environment 124) for storing application data inputs and outputs in the application data storage 132 that is separate from or a sub-environment of the first secure run-time environment for loading application 130. In addition to the application owner being prevented from accessing the first virtual environment 122 upon disablement of the first key combination as discussed above, because the second private key is private to the data owner (e.g., the application owner does not have the second private key), the application owner is prevented from accessing (e.g., from unlocking) the second virtual environment 124, and thus cannot access the application data inputs or outputs stored therein. Once the application data inputs are loaded and the application data storage 132 is prepared to receive the application data outputs, the second private key may be disabled by the orchestration logic 118 to prevent the data owner from accessing the second virtual environment 124.

Thus, by orchestrating, through the orchestration logic 118, the way the application 130 is deployed, the ingress and egress of data inputs and outputs to and from the application 130, and the sequence thereof, the prevention of data access by either party (e.g., data owner or application owner) or any other party can be guaranteed, as described in more detail elsewhere herein.

The computing platform system 120 may include one or more server devices 121 (or other similar computing devices) for executing computing platform services, and may be associated with a computing platform service provider. In some examples, the computing platform system 120 may be associated with the same or similar entity as the orchestration management system 110 (e.g., a service provider providing both orchestration and computing platform services). In other examples, the computing platform system 120 may be owned by the data owner. The computing platform system 120 may provide consumers with secure run-time environments for applications (e.g., virtual environments, such as containers). The computing platform system 120 may be secure. In some examples, the securing of the computing platform system 120 may be at least one aspect of the computing platform services offered by the computing platform service provider. In other examples, the computing platform system 120 may be secured as a function of the orchestration logic 118 utilizing a public/private key combination (e.g., a third public key and matching third private key operated by the orchestration logic 118 to enable locking and unlocking of the overall computing environment of the computing platform system 120). Additionally, each run-time or virtual environment provided by the computing platform system 120 may be separate and secure within the computing platform system 120. For example, each run-time or virtual environment may be secured as a function of the orchestration logic 18 utilizing key combinations (e.g., a public key and matching private key controlled by the orchestration logic 118 to enable locking and unlocking of the respective run-time or virtual environment), such as the above-discussed first and/or second key combinations.

As shown in FIG. 1, the computing platform system 120 may provide the data owner associated with the data owner computing device 102 with the first virtual environment 122 for running the application 130 (e.g., the first virtual environment 122 being an application environment). In some examples, the computing platform system 120 may also provide the second virtual environment 124, separate from the first virtual environment 122, for storing the data of the data owner associated with the application 130 within application data storage 132 (e.g., the second virtual environment 124 being an application data environment). In other examples, at least some of the application data storage 132 may be located in the first virtual environment 122 together with the application 130. For example, the application data storage 132 may be stored within a sub-environment of the first virtual environment 122, where reference data is provided by the application owner. The application data storage 132 may store the data inputs of one or more data owners, including the data owner associated with data owner computing device 102, consumed by the application 130 and data outputs generated by the application 130 based on the data inputs consumed. Additionally or alternatively, at least a portion the application data storage 132 may be remote (e.g., stored in a remote data storage system), and the first sub-environment, second environment and/or a third environment may include staging contents configured to provide the application data from the remote data storage system to the application 130 in the first virtual environment 122 over a communications link in the network 140. In any of the above examples, the application 130 may not have direct access to the data inputs and/or data outputs stored in the application data storage 132. For example, and as described in greater detail below, the orchestration management system 110, the application 130 may only communicate with the orchestration logic 118, where the orchestration logic 118 enables the data inputs from the application data storage 132 to be provided to the application 130 running in the first virtual environment 122 to perform one or more functions, and the data outputs resulting from the performance of the one or more functions to be received at the application data storage 132 for storage without allowing the application owner access to the data inputs and/or outputs. The orchestration logic 118 may perform a neutral role, and while executing, has no privilege to examine, copy, or otherwise change any of the virtual environments.

In some examples, the copy of the orchestration logic 118 provided by the orchestration management system 110 to the computing platform system is a part of (e.g., is embedded in) an orchestration application 109. The computing platform system 120 may store the orchestration application in a memory 152 of at least one of the server devices 121 of the computing platform system 120. When executed (e.g., by a processor 150 of the one of the server devices 121), the orchestration logic 118 may communicate with the application 130 running in the first virtual environment 122 provided by the computing platform system 120 to enable use of the application 130 while preventing data sharing. For example, the orchestration logic 118 may communicate information to enable ingress and decryption of data inputs from the application data storage 132 in the second virtual environment 124 to the application 130 for consumption and processing, and encryption and egress of data outputs from the application 130 to the application data storage 132. Based on the manner in which the orchestration logic 118 is implemented (e.g. based on the operation of the first and/or second key combinations), the data owner may be prevented from accessing underlying data of the application 130 and the application owner may be prevented from accessing the data inputs and data outputs (e.g., data owner data).

In some examples, one or more of the components of the environment 100 may be associated with the same or similar entity (e.g., the orchestration management system 110 and the computing platform system 120 may be associated with the same or similar entity or the data owner may own the computing platform system 120). In such embodiments, the components associated with the same entity may be part of a cloud service computer system (e.g., in a data center). In other examples, one or more of the components of the environment 100 may be associated with a different entity than another. The systems and devices of the environment 100 may communicate in any arrangement. As will be discussed herein, systems and/or devices of the environment 100 may communicate in order to enable use of the application 130 while preventing data sharing, among other activities.

The data owner computing device 102 and the application owner computing device 108 may be configured to enable the data owner and the application owner, respectively, to access and/or interact with other systems in the environment 100. For example, the data owner computing device 102 and/or the application owner computing device 108 may be a computer system such as, for example, a desktop computer, a laptop computer, a tablet, a smart cellular phone, a smart watch or other electronic wearable, etc. In some embodiments, the data owner computing device 102 and/or the application owner computing device 108 may include one or more electronic application(s), e.g., a program, plugin, browser extension, etc., installed on a memory of the respective computing device(s) 102, 108. In some embodiments, the electronic application(s) may be associated with one or more of the other components in the environment 100. For example, the data owner computing device 102 and/or the application owner computing device 108 may include a locally installed application and/or access a web-based application via a browser that is associated with the orchestration management system 110 in order to provide information, such as the parameters 117 used for generating the orchestration logic 118 and/or modifications thereto, to the orchestration management system 110.

Additionally, one or more components of the data owner computing device 102 and/or the application owner computing device 108 may generate, or may cause to be generated, one or more graphic user interfaces (GUIs) based on instructions/information stored in the memory, instructions/information received from the other systems in the environment 100, and/or the like and may cause the GUIs to be displayed via a display of the data owner computing device 102 and/or the application owner computing device 108. The GUIs may be, e.g., mobile application interfaces or browser user interfaces and may include text, input text boxes, selection controls, and/or the like. The display may include a touch screen or a display with other input systems (e.g., a mouse, keyboard, etc.) for the data owner of the data owner computing device 102 and/or the application owner of application owner computing device 108 to control the functions of the respective data owner computing device 102 and/or the application owner computing device 108.

While FIG. 1 depicts one application (e.g., application 130) of the application owner that is deployed to run in the first virtual environment 122, in other examples two or more applications (e.g., application 130 and one or more additional applications) that function as a block or unit may be deployed to run together in the same first virtual environment 122. The two or more applications may be associated with the same application owner or each application may be associated with a different application owner that communicates with the orchestration management system 110 via a respective application owner computing device 108. The two or more applications may be microapplications (e.g., providing microservices). For example, a first application may be a payroll program associated with a first application owner that determines an amount to pay an employee and a second application may be an employee taxation program associated with a second application owner that determines an amount to deduct from the employee's pay for taxation purposes. This exemplary first application and second application may be deployed within the same secure run-time environment to enable data sharing within the environment from the first application to the second application. Because the data sharing is within the secure run-time environment, the data can be shared without having to involve the orchestration logic 118 for sharing because they function as a single logical unit (e.g., they function as if it was one application rather than two). In such instances, the parameters 117 for generating the orchestration logic 118 may be more complex (e.g., the parameters 117 may be defined by a more complex manifest) and include each of the applications that run as the logical unit. Additionally, the parameters 117 or the manifest may stipulate, for example, a sequence in which the applications are to be loaded into the virtual environment and/or that no applications within the unit can run unless all of the applications can run.

The network 140 over which the one or more components of the environment 100 communicate may include one or more wired and/or wireless networks, such as a wide area network ("WAN"), a local area network ("LAN"), personal area network ("PAN"), a cellular network (e.g., a 3G network, a 4G network, a 5G network, etc.) or the like. In some embodiments, the network 140 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The data owner computing device 102, the application owner computing device 108, the orchestration management system 110 and/or the computing platform system 120 may be connected via the network 140, using one or more standard communication protocols. The data owner computing device 102, the application owner computing device 108, the orchestration management system 110 and/or the computing platform system 120 may transmit and receive communications from each other across the network 140, as discussed in more detail below. Communications transmitted and received over the network 140 may be secured using encrypted communications links in the network 140.

Although depicted as separate components in FIG. 1, it should be understood that a component or portion of a component in the system of exemplary environment 100 may, in some embodiments, be integrated with or incorporated into one or more other components. For example, the orchestration management system 110 may be integrated with the computing platform system 120, the orchestration logic generation system 112 and orchestration logic implementation system 114 may be integrated within the orchestration management system 110, or the like. In some embodiments, operations or aspects of one or more of the components discussed above may be distributed amongst one or more other components. Any suitable arrangement and/or integration of the various systems and devices of the exemplary environment 100 may be used.

In the following disclosure, various acts may be described as performed or executed by a component from FIG. 1, such as the data owner computing device 102, the application owner computing device 108, the orchestration management system 110, and/or the computing platform system 120, or components thereof. However, it should be understood that in various embodiments, various components of the exemplary environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2:
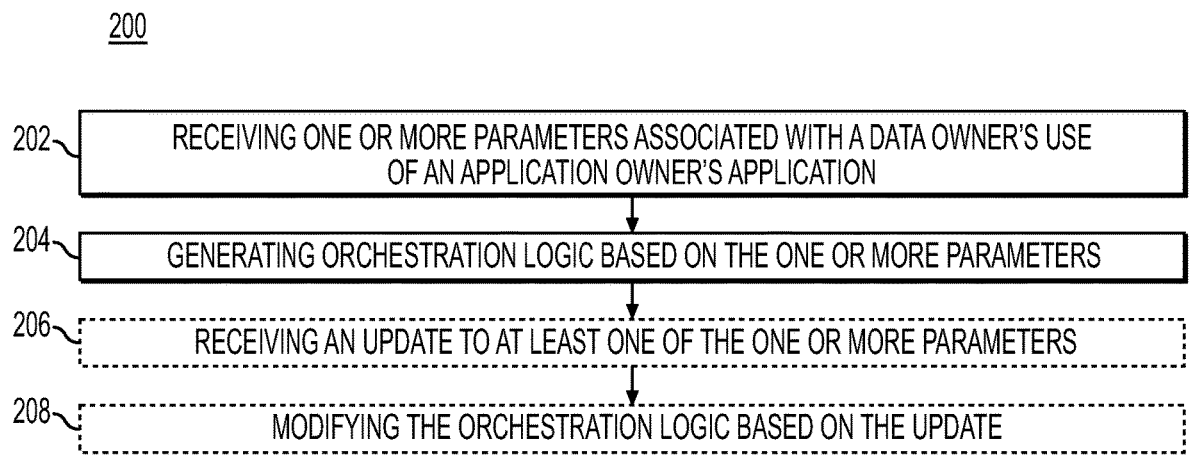
FIG. 2 depicts a flowchart of an exemplary process for generating orchestration logic implementable to orchestrate application use while preventing unauthorized data sharing, according to certain embodiments.

FIG. 2 depicts a flowchart of an exemplary process 200 for orchestrating application use while preventing data sharing, according to certain embodiments. In some examples, the process 200 may be performed by the orchestration management system 110. Initially, a data owner desiring to access and use an application, such as the application 130, and an application owner of the application may agree upon terms associated with the data owner's use of the application (e.g., via a commercial contract). The terms of the agreement, along with additional information from each of the data owner and the application owner may be received by the orchestration management system 110 as parameters 117.

For example, at step 202, the process 200 may include receiving one or more parameters, such as parameters 117. In some examples, the parameters 117 may be received over the network 140 via the application associated with the orchestration management system 110 that is executing on one or more of the data owner computing device 102 and the application owner computing device 108, respectively. The parameters 117 may include information that allows the application (e.g., application 130) to be run independently from the data owner and/or the application owner (e.g., allows the application to be run without the data owner or application owner having direct access to or control of the application). The parameters 117 may include, but are not limited to, parameters associated with the computing platform system 120, parameters associated with the application, one or more data inputs, one or more data outputs, one or more sources of the one or more data inputs, one or more destinations of the one or more data outputs, one or more decryption keys for the one or more data inputs, one or more encryption keys for the one or more data outputs, one or more termination rights of the application owner, one or more termination rights of the data owner, terms of use of the application, and/or one or more performance level parameters, each discussed in turn below.

Parameters 117 associated with the computing platform system 120 may include an identifier of the computing platform system 120 (e.g., a location) and an owner of the computing platform system 120. Parameters 117 associated with the application, or for each of multiple applications if functioning as a single unit, may include an identifier of the application, configurations for the application (e.g., an operating system configuration, a processor configuration, and a memory configuration), one or more data inputs to be consumed by the application, one or more data outputs to be generated by the application based on a processing of the data inputs, and operations to be performed on the one or more data inputs to be consumed and processed by the application in order to generate the one or more data outputs. The parameters 117 may also include one or more sources of the data inputs and/or one or more destinations of the data outputs. The sources may include private sources associated with the data owner, such as a source stored at a private network location, such as the second virtual environment 124 within the application data storage 132. Additionally or alternatively, the sources may include public sources that are available on a public network location.

Further, the one or more data inputs may be stored at the sources in an encrypted format to increase data security of the data inputs as they are stored and transmitted from storage for consumption and processing by the application. Therefore, the parameters 117 may also include one or more decryption keys for the data inputs to enable the data inputs to be decrypted using the decryption keys in a secure environment, such as the first virtual environment 122 discussed in more detail below, prior to consumption and processing by the application so that the application can understand and process the data inputs. Similarly, the data outputs at the destinations may be stored in an encrypted format. Therefore, the parameters 117 may also include one or more encryption keys for the one or more data outputs to enable the data outputs of the application to be encrypted using the encryption keys in the secure environment prior to transmission to the destinations, such that the data outputs are transmitted to and stored at the destinations in an encrypted format to increase data security.

The parameters 117 may also include a termination right of the application owner and/or data owner, terms of use, and/or performance level parameters (e.g., based on a service level agreement) that are based on the terms of the agreement between the data owner and application owner. In some examples, the termination right of the application owner may allow the application owner to revoke the right of the data owner to use the application, whereas the termination right of the data owner may allow the data owner to get out of the commercial contract if they desire to stop using the application based on terms of the agreement that were not fulfilled (e.g., may allow the data owner to stop paying for use of the application and/or receive payments back). The terms of use may include, among other information, a length of lease, any limits to a number of times the application may be run over a period of time or absolutely, and permitted and/or prohibited use types. In some examples, the terms of use may be associated with one or more of the termination rights. For example, when the length of the lease is up, the limited number of times has been reached, and/or the data owner has used the application in a prohibited manner, the termination rights of the application owner may be triggered.

A first portion of the parameters 117 may be known to both the data owner and the application owner as they are based on the terms of the agreement between the data owner and the application owner. A second portion of the parameters 117 may be known to only the party providing the information to the orchestration management system 110, and this second portion of parameters 117 may otherwise remain private and inaccessible by the other party. As one example, one or more parameters 117 specific to the data owner may be a location (e.g., a uniform resource identifier (URI)) of one or more private sources associated with the data owner for given data inputs, decryption keys for decrypting the data inputs, and encryption keys for encrypting the data outputs generated by the application based on the decrypted data inputs. As another example, one or more parameters 117 specific to the application owner may include information necessary for the application to perform a given function on the one or more data inputs to achieve the data outputs, such as underlying data of a machine learning model.

If any data is authorized to be shared between the data owner and the application owner (e.g., a particular data input or output), the particular data authorized to be shared may be included as one of the parameters 117. Otherwise, if no authorized data sharing is indicated by the parameters 117, it may be assumed that all data sharing is unauthorized. That is, unless a particular data input or output of the data owner is specified in the parameters 117, and thus acknowledged and agreed upon by the data owner and the application owner, the application owner will be unable to access any data owner data. For example, first and/or second key combinations may be operated accordingly to ensure that no unauthorized data sharing occurs, as described in detail below.

In some examples, at least a portion of the parameters 117 received may be defined in a manifest. When multiple applications are to be run as a single functional unit, the parameters 117 or the manifest may be more complex, detailing information associated with each of the applications and stipulating, for example, a sequence in the which the applications are to be loaded into a secure run-time environment and/or that no applications within the unit can run unless all of the applications can run. The parameters 117 and/or the manifest may be stored in the data storage system 116. While a manifest is described herein as a format in which at least a portion of the parameters 117 may be defined and received, other types of data exchanges and/or data messaging may be utilized.

As briefly mentioned above, in some examples, the terms of the agreement between the data owner and the application owner may also indicate that the application is to be run in a secure run-time environment, such as the first virtual environment 122 in which the application 130 is to be run. In one example, the data owner may own the computing platform system 120 comprising at least the first virtual environment 122 (and optionally second environment 124). In another example, a third party may own the computing platform system 120, and the data owner, e.g., via the data owner computing device 102, may communicate with the computing platform system 120 to request computing platform services, including a request for subscription to at least the first virtual environment 122 in which the application 130 is to be run. In some examples, the data owner may also request for subscription to a separate virtual environment, such as the second virtual environment 124, in which data associated with the application 130 (e.g., data inputs and data outputs of the application 130) may be stored in the application data storage 132. In a further example, a third party may own the computing platform system 120, and the application owner, e.g., via the application owner computing device 108, may communicate with the computing platform system 120 to request the computing platform services.

At step 204, the process 200 may include generating orchestration logic based on the one or more parameters, such as orchestration logic 118 generated based on parameters 117. The orchestration logic 118 may be stored in the data storage system 116. A copy of the orchestration logic 118 may also be provided to the computing platform system 120. The orchestration logic 118 may enable use of the application 130 by the data owner while preventing data sharing by either the data owner or the application owner, unless otherwise permitted or authorized by the orchestration logic 118.

At optional step 206, the process 200 may include receiving a modification to at least one of the one or more parameters 117. The orchestration logic 118 may be retrieved from the data storage system 116 and, at optional step 208, the process 200 may include updating the orchestration logic 118 based on the modification. The updated orchestration logic 118 and modified parameter(s) 117 may be stored in data storage system 116. In examples, where the orchestration logic 118 has been previously provided to the computing platform system 120 and the orchestration logic 118 is subsequently updated at step 208, the updated orchestration logic 118 may be automatically provided to the computing platform system.

As discussed above in more detail with reference to FIG. 1, public key encryption, among other cryptographic techniques, may be used to ensure confidentiality of the parameters 117 received at step 202 and any updates to the parameters 117 received at optional step 208.

Accordingly, certain embodiments may be performed for generating orchestration logic implementable to orchestrate application use while preventing unauthorized data sharing. The process 200 described above is provided merely as an example, and may include additional, fewer, different, or differently arranged steps than depicted in FIG. 2.

Figure 3:
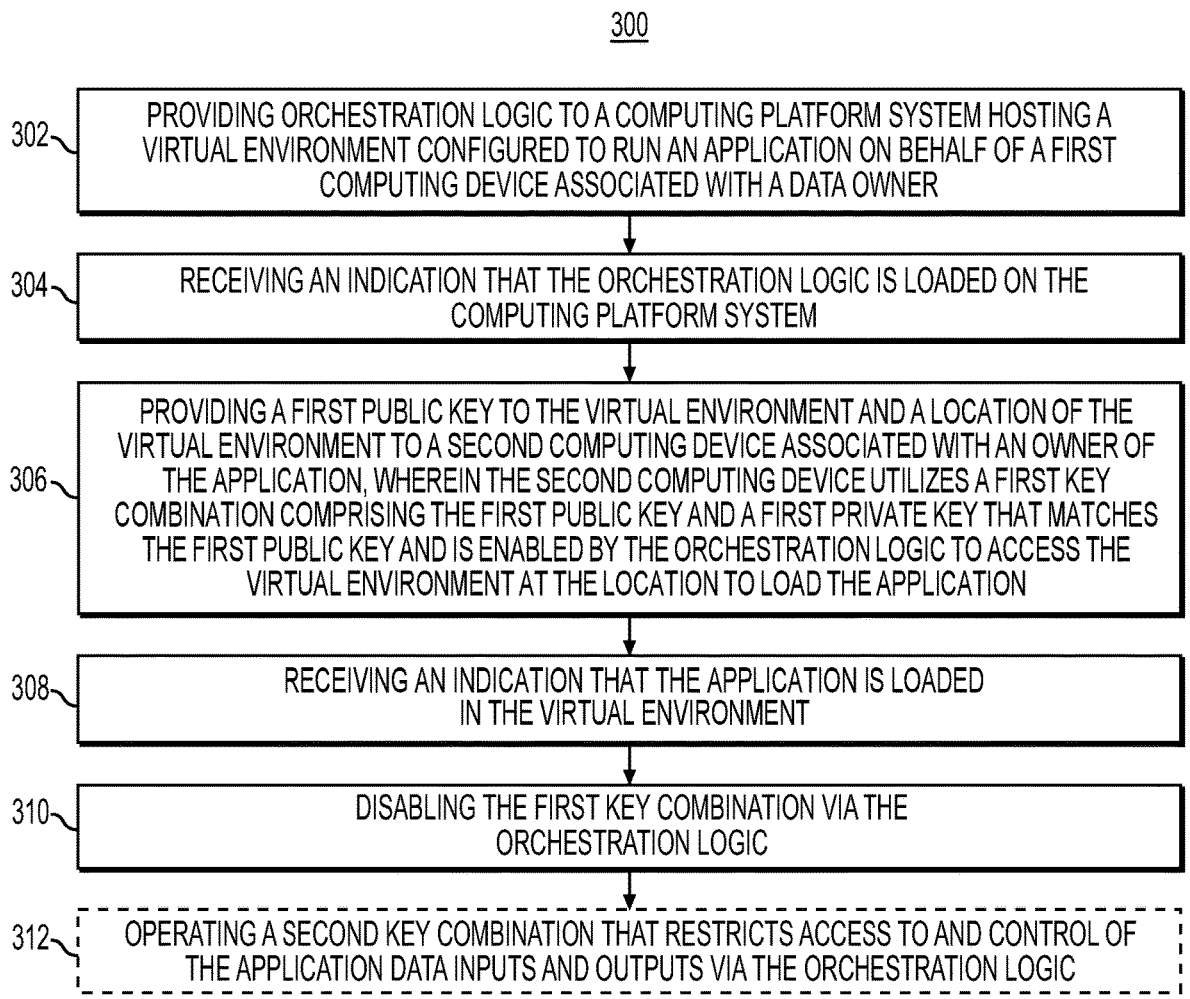
FIG. 3 depicts a flowchart of an exemplary process for orchestrating application use while preventing unauthorized data sharing, according to certain embodiments.

FIG. 3 depicts a flowchart of an exemplary process 300 for orchestrating application use while preventing unauthorized data sharing, according to certain embodiments. In some examples, the process 300 may be performed by the orchestration management system 110. The process 300 may be performed subsequent to the generation of the orchestration logic (e.g., orchestration logic 118) at step 204 of process 200, described above with reference to FIG. 2.

At step 302, the process 300 may include providing the orchestration logic 118 to the computing platform system 120 hosting the virtual environment (e.g., first virtual environment 122) configured to run the application 130 on behalf of a first computing device associated with a data owner (e.g., data owner computing device 102). Once the application is loaded (e.g., after step 306 described below), the application 130 may consume one or more data inputs of the data owner to generate one or more data outputs as provided for in (e.g., as instructed by) the orchestration logic 118. In some examples, the data inputs of the data owner to the application 130 and/or data outputs of the application 130 may be stored in the application data storage 132 in a separate virtual environment controlled by the data owner, such as the second virtual environment 124 provided by the computing platform system 120.

At step 304, the process 300 may include receiving an indication that the orchestration logic is loaded on the computing platform system 120 receiving an indication that the orchestration logic is loaded on the computing platform system 120. The loading of the orchestration logic 118 onto the computing platform 120 may guarantee that, when the application 130 is being run in the virtual environment (e.g., first virtual environment 122), the application 130 is able to receive data inputs of the data owner necessary to perform application functions (e.g., to produce data outputs) such that the application 130 is operable without the application owner having access to the data owner data inputs and data outputs. The orchestration logic 118 may also prevent any data owner, including the data owner associated with the first computing device, from having access to the application 130 through the operation of a first key combination that restricts access to the first virtual environment 122 in which the application 130 is to be loaded into and run.

At step 306, the process 300 may include providing a first public key to the virtual environment configured to run the application and a location of the virtual environment to a second computing device associated with an owner of the application. For example, the second computing device may be the application owner computing device 108 that uses a first private key of the first key combination that is enabled by the orchestration logic 118, e.g., the application owner's private key that matches the first public key to the first virtual environment 122, to access the first virtual environment 122 at the location to load the application 130.

At step 308, the process 300 may include receiving an indication (e.g., a load completion indication) that the second computing device has loaded the application into the virtual environment using the first key combination comprising the first public key and the matching first private key. For example, once the application owner computing device 108 has loaded the application 130 into the first virtual environment 122 using the first public key and the matching first private key to access (e.g., "unlock") the first virtual environment 122, the application owner computing device 108 may transmit a load completion indication signal to the orchestration management system 110. Unless the application owner is otherwise authorized to retain access to and/or control of the application 130 loaded into the first virtual environment 122 based on the orchestration logic 118, the orchestration logic 118 may disable at least the application owner's first private key so that it is no longer able to unlock the first virtual environment 122 to gain access. This "lock" on the virtual environment 122 also prevents access to the application 130 by the data owner or any other party, effectively securing the application 130 in the first virtual environment 122 such that no further changes may be made by another party unless permitted by the orchestration logic 118. If another party is permitted by the orchestration logic 118 to make changes, the matching first private key to the first public key for the first virtual environment 122 may be provided to the other permitted party. That is, the application owner may have a guarantee that the data owner or any other party is unable to access underlying data of the application 130 (e.g., cannot extract proprietary data of the application) or use the application 130 for other third parties not permitted by the orchestration logic 118.

In some examples, the disabling of the first key combination may be an end step of process 300. For example, where the computing platform system 120 is owned by the data owner, the end step may be step 310, where the first key combination may be disabled via the orchestration logic 118 to restrict access to and control of the application 130. The disabling may include disabling at least the first matching private key of the first key combination. In other examples, both the first public key and the first matching private key may be disabled. As a result, the application owner may be prevented from accessing the virtual environment (e.g., first virtual environment 122) and thus is prevented from accessing and/or controlling the application 130 and/or data inputs consumed by or data outputs generated by the application 130 as it runs in the first virtual environment 122. For example, at least the first matching private key of the application owner may be disabled such that it does not work to "unlock" the first virtual environment 122. Therefore, the application owner is prevented from accessing the first virtual environment 122 to redirect application data inputs and outputs as the application 130 is running e.g., in violation of agreement terms.

In other examples, process 300 may also include step 312, such as when the computing platform system 120 is owned by a third party (e.g., a different party than the application owner and the data owner). At step 312, the process 300 may include operating a second key combination via the orchestration logic 118 that restricts access to and control of the application data inputs and outputs (e.g., the application data storage 132 in the second virtual environment 124), unless otherwise provided for by the orchestration logic 118. For example, the orchestration management system 110 may provide a second public key to the second virtual environment 124 and a location of the second virtual environment 124 configured to store the application data storage 132 to the first computing device (e.g., the data owner computing device 102) with instructions to load the data inputs to be processed by the application 130 and prepare the application data storage 132 to receive the application's data outputs in accordance with the orchestration logic 118. The data owner computing device 102 may use a second private key of the data owner that matches the second public key to the second virtual environment 124 and the location thereof to load the data inputs and prepare the application data storage 132. Once completed, a completion signal may be transmitted to the orchestration management system 110 (e.g., via the application associated with the orchestration management system 110 executing on the data owner computing device 102). The operation of the second key combination comprising the second private key of the data owner may prevent the application owner from gaining access to the one or more data inputs consumed by and the one or more data outputs generated by the application 130 stored in the application data storage 132 of the second virtual environment 124 (e.g., because the application owner does not have knowledge of the second private key).

Once the data inputs to the application 130 are loaded and the application data storage 132 is prepared to receive the data outputs, access to and/or control of the data in the application data storage 132 within the second virtual environment 124 by the data owner may then be restricted by the orchestration logic 118. Restricted access and/or control may be implemented by disabling the second key combination similar to the disabling of the first key combination described above at step 310. In some examples, once at least the first key combination is disabled, the orchestration management system 110 may receive an indication from the orchestration logic 118 via the orchestration application 109 executing on the computing platform system 120, and send a notification to the data owner, via the first computing device, to indicate that the application 130 is ready for use. The notification may also include a confirmation that the application owner is unable to access any data of the data owner unless otherwise authorized by the data owner as part of the agreement between the data owner and application owner.

Additionally, once at least the first key combination is disabled, data input ingress to and data output egress from the application 130 may be initiated via the orchestration logic 118 on the computing platform system 120. To provide an illustrative example using the environment 100 described in FIG. 1, the information comprising the orchestration logic 118, such as the sources of the data inputs and destinations of the data outputs, may be utilized to make connections to the source of the data inputs and destination of data outputs. For example, a source of at least a portion of the data inputs (e.g., a portion of private data inputs associated with the data owner) may be the application data storage 132 stored in the second virtual environment 124, another portion of data inputs may be public data obtainable from public domain sources, and the application data storage 132 may also be a destination for the data outputs. Once the connections have been made, the application 130 may be run in the first virtual environment 122 such that the data inputs may be received from the source of the data inputs for consumption by the application 130 (e.g., as part of one or more functions of the application 130) in order to generate the data outputs. The data outputs once generated may then be transmitted to the destination(s) of the data outputs.

In some examples, the orchestration management system 110 may also support error reporting. For example, if any errors are encountered as the application 130 is running in the first virtual environment 122, the orchestration management system 110 may receive signals from the computing platform system 120 (e.g., from the orchestration logic 118 via the orchestration application 109), where the signals may indicate the errors encountered. The errors may then be forwarded to the application owner (e.g., to application owner computing device 108) to allow developers of the application 130, for example, to address the errors.

In other examples, one or more parameters 117 on which the orchestration logic 118 are based (e.g., term of use parameters) may limit a number of times the application 130 and/or a function of the application 130 may be run, where the limit may be time-based (e.g., once per 24 hour period) or absolute (e.g., one time only). Additionally or alternatively, the parameters 117 may include termination rights that allow the data owner and/or application owner to terminate their former agreement and stop the usage of the application 130 by the data owner (e.g., upon detection of a triggering event by the orchestration logic 118). The triggering event may be based on terms of use, such as when a lease expires and/or when the application owner improperly uses the application (e.g., performs a prohibited use defined in the agreement, uses in a contradictory manner to the allowed use described in the agreement, and/or uses beyond the scope of the agreement). The triggering event may also be based on a signal received from the application owner and/or data owner (e.g., if the application owner and/or data owner are permitted to terminate the agreement at any time). When a triggering event is detected, the orchestration logic 118 may initiate a termination process. In some examples, the termination process may cause an automatic destruction of at least the first virtual environment 122 in which the application 130 is run. The second virtual environment 124 may also be automatically destroyed. In some instances, only the data owner may have the ability to destroy the second virtual environment 124.

For an application, such as application 130, the above-described steps of process 300 may be performed one time (e.g., prior to and as the application 130 is being loaded into the first virtual environment 122 for the first time). That is, the process 300 does not have to be repeated each time an instance of the application is run. In examples where two or more applications that function as a single unit are run within the same virtual environment, the above-described steps of process 300 may be performed for each application. In some examples, the above-described steps of process 300 may occur serially for each application. In other examples, the above-described steps of process 300 may occur in parallel for each application.

To provide an illustrative example of where two or more applications that function as a single unit are run within the same virtual environment, the application 130 may be a first application and the first virtual environment 122 may be configured to run the first application and a second application. The second application may consume at least one of the one or more data outputs of the first application to generate one or more second application data outputs. The orchestration logic provided to the computing platform system 120 at step 302 may be generated based on parameters associated with the data owner's use of both the first application and the second application. Then, steps 306-310 described above with reference to the first application and the second computing device (e.g., application owner computing device 108) may occur serially or in parallel with similar steps performed for the second application and a third computing device of an application owner of the second application (e.g., a second application owner). For example, the orchestration management system 110 may provide a third public key (of a third key combination) to the virtual environment and the location of the virtual environment to the third computing device of the second application owner (similar to step 306). The orchestration management system 110 may receive an indication that the third computing device loaded the second application into the virtual environment using the third key combination that includes the third public key and a third private key of the second application owner that matches the third public key and is enabled by the orchestration logic to access the virtual environment at the location to load the second application (similar to step 308). The third key combination may then be disabled via the orchestration logic once the second application is loaded. The third computing device may be the application owner computing device 108 if the second application owner is the same application owner associated with the first application. Alternatively, the third computing device may be a different computing device associated with the second application owner.

In such examples, where the first and second applications are loaded into the same virtual environment, at least one of the one or more data outputs of the first application may be sharable from the first application to the second application within the virtual environment (e.g., without requiring communication via the orchestration logic 118) to allow the first application and the second application to function as a single unit. Nonetheless, once both the first and second applications are loaded, the disabling of the first and third key combinations via the orchestration logic 118 further restricts access to and control of the first and second applications in the virtual environment. Resultantly, the first application owner and second application owner may be prevented from gaining access to either the first or second applications, the one or more data inputs consumed by the first application, the one or more data outputs generated by the first application that include the data outputs consumed by the second application, and/or the one or more second application data outputs generated by the second application.

Accordingly, certain embodiments may orchestrate application use while preventing unauthorized data sharing. The process 300 described above is provided merely as an example, and may include additional, fewer, different, or differently arranged steps than depicted in FIG. 3.

Figure 4:
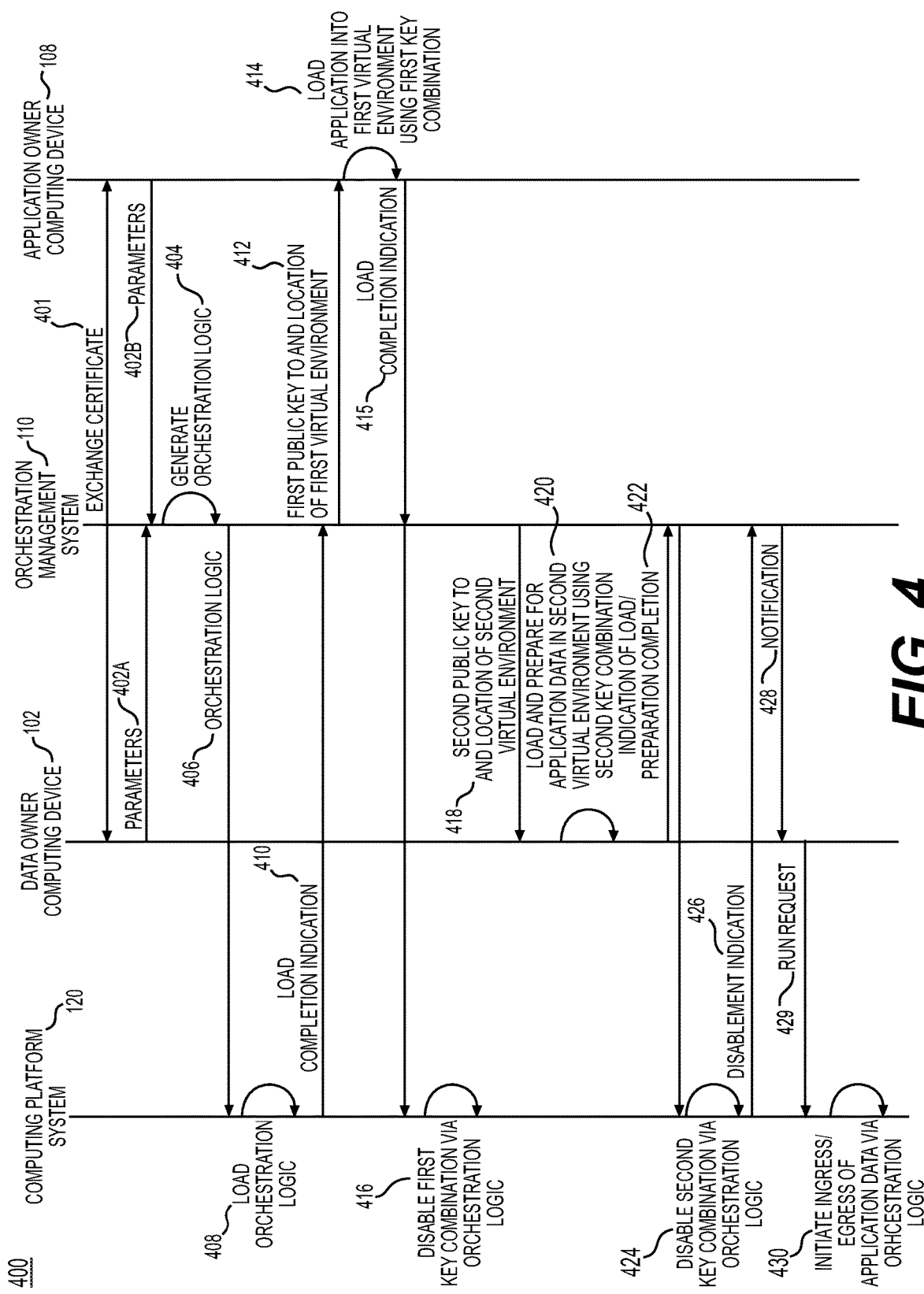
FIG. 4 depicts a communication diagram illustrating interactions between components of various systems of the exemplary environment for orchestrating application use while preventing unauthorized data sharing described in FIG. 1.

FIG. 4 depicts a communication diagram 400 illustrating interactions between the various systems and devices of the exemplary environment 100 for orchestrating application use while preventing unauthorized data sharing, described in detail with reference to FIG. 1. The various systems and devices may include the data owner computing device 102, the application owner computing device 108, the orchestration management system 110, and the computing platform system 120. In this particular communication diagram 400, the computing platform system 120 may be owned by a third party different from the data owner and the application owner, and thus at least two private/public key combinations (e.g., first and second key combinations) may be utilized by the orchestration logic 118.

Initially, at step 401, the orchestration management system 110 may exchange a certificate. The certificate may be exchanged with the application owner computing device 108 (or to a location on the network 140 accessible by the application owner computing device 108) and with the data owner computing device 102 (or to a location on the network 140 accessible by the application owner computing device 108). The certificate may signal to the application owner and the data owner an identity of a service provider of the orchestration management system 110 as a trusted provider.

As described in more detail above with reference to process 200 of FIG. 2, the orchestration management system 110 may receive parameters, such as parameters 117, from the data owner computing device 102 and/or the application owner computing device 108 at steps 402A and 402B, respectively. The parameters 117 may include terms of an agreement between the data owner and application owner associated with the data owner's use of the application, as well as any other information necessary for an application of the application owner (e.g., application 130) to be run independently from the data owner and/or the application owner in a separate, secure run-time environment. At step 404, the orchestration management system 110 may generate orchestration logic (e.g., orchestration logic 118) based on the parameters 117.

In some examples, based on the terms of the agreement, the data owner and/or the application owner may be responsible for establishing the separate, secure run-time environment (e.g., one or more virtual environments) for the application with a third party such as the computing platform service provider associated with computing platform system 120. In such examples, a request for generation of one or more virtual environments may be received at the computing platform system 120, and the computing platform system 120 may generate the virtual environment(s). For example, a first virtual environment (e.g., first virtual environment 122) may be generated in which the application is to be run. Additionally, a second virtual environment separate from the first virtual environment (e.g., second virtual environment 124) may be generated to store data of the application. As described in more detail with reference to process 300 of FIG. 3, once the virtual environment(s) have been generated, the details of which (e.g., a location of the virtual environment) are include in the parameters 117 provided at step 402A and/or 402B, the orchestration management system 110 may provide the orchestration logic generated at step 404 (e.g., embedded within orchestration application 109) to the computing platform system 120 at step 406. The computing platform system 120 may load the orchestration logic at step 408 and provide a load completion indication to the orchestration management system 110 at step 410.

Upon receiving the load completion indication at step 410, the orchestration management system 110 may provide a first public key to the virtual environment in which the application is to be loaded into and run (e.g., first virtual environment 122) and the location thereof to the application owner computing device 108 at step 412. The application owner computing device 108 may use a first private key of the application owner that matches the first public key (e.g., the first public key and matching first private key comprising the first key combination) to load the application into the virtual environment at the location provided at step 414. Once the application has been loaded into the virtual environment, the application owner computing device 108 may send a load completion indication to the orchestration system at step 415, which may be forwarded by the orchestration management system 110 to the computing platform system 120 (e.g., via orchestration application 109). Once the application is loaded, the first key combination may be disabled via the orchestration logic executing (e.g., as part of orchestration application 109) on the computing platform system 120.

A second key combination may also be operated in parallel and/or serially with the first key combination. For example, at step 418, the orchestration management system 110 may provide the data owner computing device 102 with a second public key to the virtual environment storing the application data inputs and outputs within application data storage 132 (e.g., the second virtual environment 124) and a location thereof with instructions to load the data inputs to be processed by the application 130 and prepare the application data storage 132 to receive the application's data outputs in accordance with the orchestration logic 118. At step 420, the data owner computing device 102 may use a second private key of the data owner that matches the second public key (e.g., the second public key and the matching second private key comprising the second key combination) to gain access to the second virtual environment 124 at the location in order to load the data inputs and prepare the application data storage 132 therein. The data inputs may include data of the data owner associated with the data owner computing device 102 and/or data of one or more other data owners. Once completed, a load and preparation completion indication may be transmitted to the orchestration management system 110 at step 422, which may be forwarded by the orchestration management system 110 to the computing platform system 120 (e.g., via orchestration application 109). At step 424, the second key combination may be disabled via the orchestration logic executing (e.g., as part of orchestration application 109) on the computing platform system 120. The orchestration logic may then transmit a disablement indication to the orchestration management system 110 at step 426. In some examples, separate disablement indications may be sent after step 416 and step 424.

At step 428, the orchestration management system 110 may send a notification to the data owner computing device 102 to indicate that the application is ready for use. In some examples, the data owner computing device 102 may then transmit a run request to the computing platform system 120 at step 429 to cause the application 130 to be run in the first virtual environment 122. Additionally, the orchestration logic executing (e.g., as part of orchestration application 109) on the computing platform system 120 may initiate application data ingress and egress to one or more data owners as defined by the orchestration logic 118 to enable use of the application when run in the virtual environment.

As previously discussed, in this particular communication diagram 400, the computing platform system 120 may be owned by a third party different from the data owner and the application owner, and thus at least two private/public key combinations (e.g., the first and second key combinations) may be utilized by the orchestration logic 118. In other examples, when the computing platform system 120 is owned by the data owner, then only one private/public key combination may be needed (e.g., only the first key combination). For example, after step 424, the first key combination may be disabled and then any notifications may be generated and transmitted and/or ingress and egress of data may occur (e.g., similar to steps 428 and 430).

In general, any process or operation discussed in this disclosure that is understood to be computer-implementable, such as the processes or operations depicted in FIGS. 2-4, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable type of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 5:
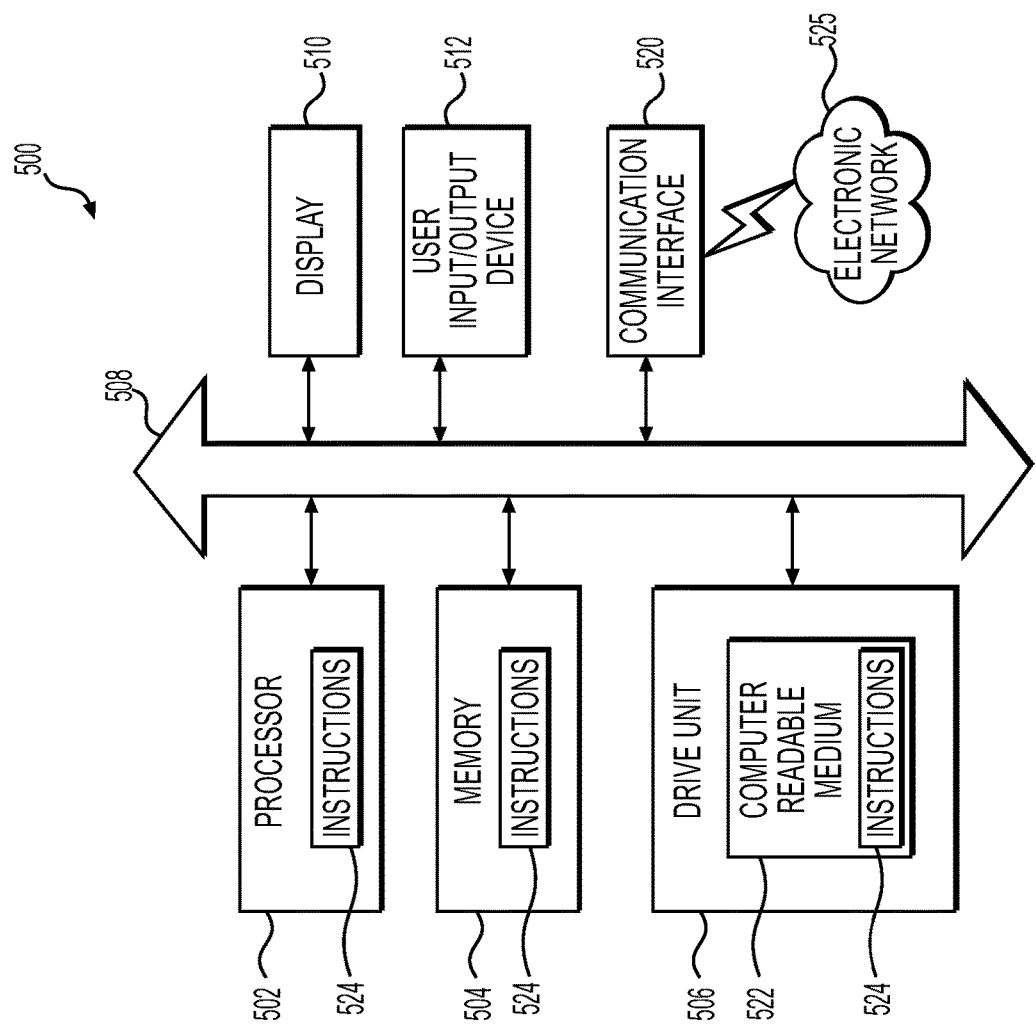
FIG. 5 depicts an example of a computer, according to certain embodiments.

FIG. 5 depicts an example of a computer 500, according to certain embodiments. FIG. 5 is a simplified functional block diagram of a computer 500 that may be configured as a device for executing processes or operations depicted in, or described with respect to, FIGS. 2-4, according to exemplary embodiments of the present disclosure. For example, the computer 500 may be configured as one of the data owner computing device 102, the application owner computing device 108, the orchestration management system 110, the computing platform system 120, and/or another device according to exemplary embodiments of this disclosure. In various embodiments, any of the systems herein may be a computer 500 including, e.g., a data communication interface 520 for packet data communication. The computer 500 may communicate with one or more other computers 500 using the electronic network 525. The electronic network 525 may include a wired or wireless network similar to the network 140 depicted in FIG. 1.

The computer 500 also may include a central processing unit ("CPU"), in the form of one or more processors 502, for executing program instructions 524. The program instructions 524 may include instructions for running applications, including the application that is associated with the orchestration management system 110 (e.g., if the computer 500 is the data owner computing device 102 and/or the application owner computing device 108). The program instructions 524 may include instructions for running the orchestration application 109 (e.g., if the computer 500 is the at least one of the server devices 121 of the computing platform system 120). The program instructions 524 may include instructions for running one or more operations of the server side systems (e.g., if the computer 500 is a server device or other similar computing device of one or more of the orchestration management system 110 and/or the computing platform system 120). The computer 500 may include an internal communication bus 508, and a drive unit 506 (such as read-only memory (ROM), hard disk drive (HDD), solid-state disk drive (SDD), etc.) that may store data on a computer readable medium 522, although the computer 500 may receive programming and data via network communications. The computer 500 may also have a memory 504 (such as random access memory (RAM)) storing instructions 524 for executing techniques presented herein, although the instructions 524 may be stored temporarily or permanently within other modules of computer 500 (e.g., processor 502 and/or computer readable medium 522). The computer 500 also may include user input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features. For example, while some of the embodiments above pertain to training and/or using one or more trained machine learning models for activity-based prompting of task completion to determine a communication channel for notification transmission, any suitable activity may be used.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method, comprising:
   providing, by an orchestration management system, orchestration logic to a computing platform system hosting a virtual environment configured to run an application on behalf of a first computing device associated with a data owner;
   receiving an indication that the orchestration logic is loaded on the computing platform system;
   providing a first public key to the virtual environment and a location of the virtual environment to a second computing device associated with an owner of the application;
   enabling, by the orchestration logic, the second computing device to access the virtual environment at the location to load the application utilizing a first key combination comprising the first public key and a first private key that matches the first public key; and
   disabling, by the orchestration logic, at least the first private key upon the application loading into the virtual environment to prevent subsequent access to the virtual environment by the owner of the application.

2. The method of claim 1, wherein the virtual environment at the location is a first virtual environment at a first location, and the computing platform system further hosts a second virtual environment at a second location that is separate from the first virtual environment and is configured to store one or more data inputs of one or more data owners, including the data owner, that are consumed by the application and one or more data outputs that are generated by the application.

3. The method of claim 2, further comprising:
   providing to the application, via the orchestration logic, the second location of the second virtual environment to enable ingress of the one or more data inputs into the first virtual environment and egress of the one or more data outputs from the first virtual environment when the application is run.

4. The method of claim 2, further comprising:
   providing a second public key to the second virtual environment and the second location of the second virtual environment to the first computing device associated with the data owner;
   enabling, by the orchestration logic, the first computing device to access the second virtual environment at the second location to load the one or more data inputs and arrange receipt of the one or more data outputs into the second virtual environment utilizing a second key combination comprising the second public key and a second private key that matches the second public key; and
   disabling, by the orchestration logic, at least the second private key upon the one or more data inputs loading and arranging receipt of the one or more data outputs into the second virtual environment to prevent subsequent access to the second virtual environment by the data owner.

5. The method of claim 1, further comprising:
generating the orchestration logic based on one or more parameters received from at least one of the data owner or the application owner.

6. The method of claim 5, wherein the one or more parameters are associated with at least one of the computing platform system, the application, one or more data inputs to be consumed by the application, one or more data outputs to be generated by the application, one or more sources of the one or more data inputs, one or more destinations of the one or more data outputs, one or more decryption keys for the one or more data inputs, one or more encryption keys for the one or more data outputs, a termination right of the application owner, a termination right of the data owner, terms of use of the application, or performance level parameters.

7. The method of claim 5, wherein the one or more parameters are defined in a manifest.

8. The method of claim 5, further comprising:
receiving a modification of the one or more parameters;
updating the orchestration logic based on the modification; and
providing the updated orchestration logic to the first computing device.

9. The method of claim 5, further comprising:
prior to receiving the parameters, issuing a certificate to the first computing device and the second computing device, the certificate signaling to the data owner and the application owner that the orchestration management system is a trusted provider.

10. The method of claim 1, wherein the application is a first application, the virtual environment is configured to run the first application and a second application that consumes at least one data output of the first application to generate one or more second application data outputs, and the method further comprises:
providing a third public key to the virtual environment and the location of the virtual environment to a third computing device of a second application owner of the second application;
enabling, by the orchestration logic, the third computing device to access the virtual environment at the location to load the second application utilizing a third key combination comprising the third public key and a third private key that matches the third public key; and
disabling, by the orchestration logic, at least the third private key upon the second application loading into the virtual environment to prevent subsequent access to the virtual environment by the second application owner, wherein the at least one data output of the first application is sharable from the first application to the second application within the virtual environment.

11. A system comprising:
at least one memory storing instructions; and
at least one processor operatively connected to the at least one memory and configured to execute the instructions to perform operations, including:
providing orchestration logic to a computing platform system hosting a virtual environment configured to run an application on behalf of a first computing device associated with a data owner;
receiving an indication that the orchestration logic is loaded on the computing platform system;
providing a first public key to the virtual environment and a location of the virtual environment to a second computing device associated with an owner of the application;
enabling, by the orchestration logic, the second computing device to access the virtual environment at the location to load the application utilizing a first key combination comprising the first public key and a first private key that matches the first public key; and
disabling, by the orchestration logic, at least the first private key upon the application loading into the virtual environment to prevent subsequent access to the virtual environment by the owner of the application.

12. The system of claim 11, wherein the virtual environment at the location is a first virtual environment at a first location, and the computing platform system further hosts a second virtual environment at a second location that is separate from the first virtual environment and is configured to store one or more data inputs of one or more data owners, including the data owner, that are consumed by the application and one or more data outputs that are generated by the application.

13. The system of claim 12, the operations further including:
providing to the application, via the orchestration logic, the second location of the second virtual environment to enable ingress of the one or more data inputs into the first virtual environment and egress of the one or more data outputs from the first virtual environment when the application is run.

14. The system of claim 12, the operations further including:
providing a second public key to the second virtual environment and the second location of the second virtual environment to the first computing device associated with the data owner;
enabling, by the orchestration logic, the first computing device to access the second virtual environment at the second location to load the one or more data inputs and arrange receipt of the one or more data outputs into the second virtual environment utilizing a second key combination comprising the second public key and a second private key that matches the second public key; and
disabling, by the orchestration logic, at least the second private key upon the one or more data inputs loading and arranging receipt of the one or more data outputs into the second virtual environment to prevent subsequent access to the second virtual environment by the data owner.

15. The system of claim 11, the operations further comprising:
generating the orchestration logic based on one or more parameters received from at least one of the data owner or the application owner, wherein the one or more parameters are associated with at least one of the computing platform system, the application, one or more data inputs to be consumed by the application, one or more data outputs to be generated by the application, one or more sources of the one or more data inputs, one or more destinations of the one or more data outputs, one or more decryption keys for the one or more data inputs, one or more encryption keys for the one or more data outputs, one or more termination rights of the application owner, one or more termination rights of the data owner, terms of use of the application, or one or more performance level parameters.

16. The system of claim 15, the operations further including:
receiving a modification of the one or more parameters;
updating the orchestration logic based on the modification; and
providing the updated orchestration logic to the first computing device.

17. The system of claim 15, the operations further including:
prior to receiving the parameters, issuing a certificate to the first computing device and the second computing device, the certificate signaling to the data owner and the application owner that the system is a trusted provider.

18. The system of claim 11, wherein the application is a first application, the virtual environment is configured to run the first application and a second application that consumes at least one data output of the first application to generate one or more second application data outputs, and the operations further include:
providing a third public key to the virtual environment and the location of the virtual environment to a third computing device of a second application owner of the second application;
enabling, by the orchestration logic, the third computing device to access the virtual environment at the location to load the second application utilizing a third key combination comprising the third public key and a third private key that matches the third public key; and
disabling, by the orchestration logic, at least the third private key upon the second application loading into the virtual environment to prevent subsequent access to the virtual environment by the second application owner, wherein the at least one data output of the first application is sharable from the first application to the second application within the virtual environment.

19. A computer-implemented method, comprising:
receiving, by an orchestration management system, one or more parameters from at least one of a first computing device of a data owner or a second computing device of an application owner, the one or more parameters associated with the data owner's use of an application of the application owner, and at least one of the one or more parameters identifying a computing platform system of the data owner hosting a virtual environment configured to run the application;
generating orchestration logic based on the one or more parameters;
providing the orchestration logic to the computing platform system;
receiving an indication that the orchestration logic is loaded on the computing platform system;
providing a first public key to the virtual environment and a location of the virtual environment to the second computing device;
enabling, by the orchestration logic, the second computing device to access the virtual environment at the location to load the application utilizing a first key combination comprising the first public key and a first private key that matches the first public key, and
disabling, by the orchestration logic, at least the first private key upon the application loading into the virtual environment to prevent subsequent access to the virtual environment by the owner of the application.

20. The method of claim 19, further comprising:
providing to the application, via the orchestration logic, a location of one or more data inputs to be received and consumed by the application within the computing platform system and a location for storing one or more data outputs generated by the application within the computing platform system.

* * * * *